US012713497B2

(12) United States Patent
Yang et al.

(10) Patent No.: US 12,713,497 B2
(45) Date of Patent: Aug. 18, 2026

(54) USER EQUIPMENT BEHAVIOR FOR SIGNALING ASSOCIATED WITH DISCONTINUOUS RECEPTION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/477,472

(22) Filed: Sep. 28, 2023

(65) Prior Publication Data

US 2024/0129999 A1 Apr. 18, 2024

Related U.S. Application Data

(60) Provisional application No. 63/380,046, filed on Oct. 18, 2022.

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01)

(58) Field of Classification Search
None
See application file for complete search history.

(56) References Cited

U.S. PATENT DOCUMENTS

| | | | | |
|---|---|---|---|---|
| 2019/0150114 | A1* | 5/2019 | Liu | H04W 48/16 370/252 |
| 2019/0320490 | A1* | 10/2019 | Liu | H04W 52/0216 |
| 2019/0387572 | A1* | 12/2019 | Nam | H04W 8/24 |
| 2021/0259044 | A1* | 8/2021 | Islam | H04W 72/535 |
| 2021/0352581 | A1* | 11/2021 | Wong | H04W 52/0235 |
| 2022/0312325 | A1* | 9/2022 | Turtinen | H04W 76/28 |
| 2024/0147368 | A1* | 5/2024 | Shubhi | H04W 52/0235 |

* cited by examiner

*Primary Examiner* — Jamaal Henson
(74) *Attorney, Agent, or Firm* — ArentFox Schiff LLP

(57) ABSTRACT

In an aspect of the disclosure, a method, a computer-readable medium, and an apparatus are provided. The apparatus may be a user equipment (UE) or a component thereof that may be configured to receive, from a network node, information configuring a set of discontinuous reception (DRX) preparatory signals associated with a set of DRX cycles, with each DRX preparatory signal of the set of DRX preparatory signals indicating an instruction to transition from a lower power state to a higher power state for a respective DRX cycle of the set of DRX cycles. The apparatus may be further configured to ignore at least one DRX preparatory signal of the set of DRX preparatory signals.

29 Claims, 10 Drawing Sheets

400

410

450

Reference Signal

Control/Data

416 TX Processor

475 Controller /Processor

476 Memory

474 Channel Estimator

470 RX Processor

418 TX RX

420

452

454 RX TX

456 RX Processor

458 Channel Estimator

468 TX Processor

459 Controller/ Processor

460 Memory

Control / Data

Reference Signal

USER EQUIPMENT BEHAVIOR FOR SIGNALING ASSOCIATED WITH DISCONTINUOUS RECEPTION

CROSS REFERENCE TO RELATED APPLICATION(S)

This application claims the benefit of U.S. Provisional Application Ser. No. 63/380,046, entitled "USER EQUIPMENT BEHAVIOR FOR SIGNALLING ASSOCIATED WITH DISCONTINUOUS RECEPTION" and filed on Oct. 18, 2022, which is expressly incorporated by reference herein in its entirety.

BACKGROUND

Technical Field

The present disclosure generally relates to communication systems, and more particularly, to a user equipment (UE) that is configured to autonomously determine whether to ignore signaling associated with an on duration of a discontinuous reception (DRX) cycle from a network node.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or a component thereof that may be configured to receive, from a network node, information configuring a set of discontinuous reception (DRX) preparatory signals associated with a set of DRX cycles, with each DRX preparatory signal of the set of DRX preparatory signals indicating an instruction to transition from a lower power state to a higher power state for a respective DRX cycle of the set of DRX cycles. The apparatus may be further configured to ignore at least one DRX preparatory signal of the set of DRX preparatory signals.

In another aspect of the disclosure, another method, another computer-readable medium, and another apparatus are provided. The other apparatus may be a network node or a component thereof that may be configured to transmit, to a UE, information configuring a set of DRX preparatory signals associated with a set of DRX cycles, with each DRX preparatory signal of the set of DRX preparatory signals indicating an instruction for the UE to transition from a lower power state to a higher power state for a respective DRX cycle of the set of DRX cycles. The other apparatus may be further configured to transmit, to the UE, at least one DRX preparatory signal of the set of DRX preparatory signals. The other apparatus may be further configured to receive, from the UE, information indicating the at least one DRX preparatory signal of the set of DRX preparatory signals was autonomously ignored by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Figure 1:
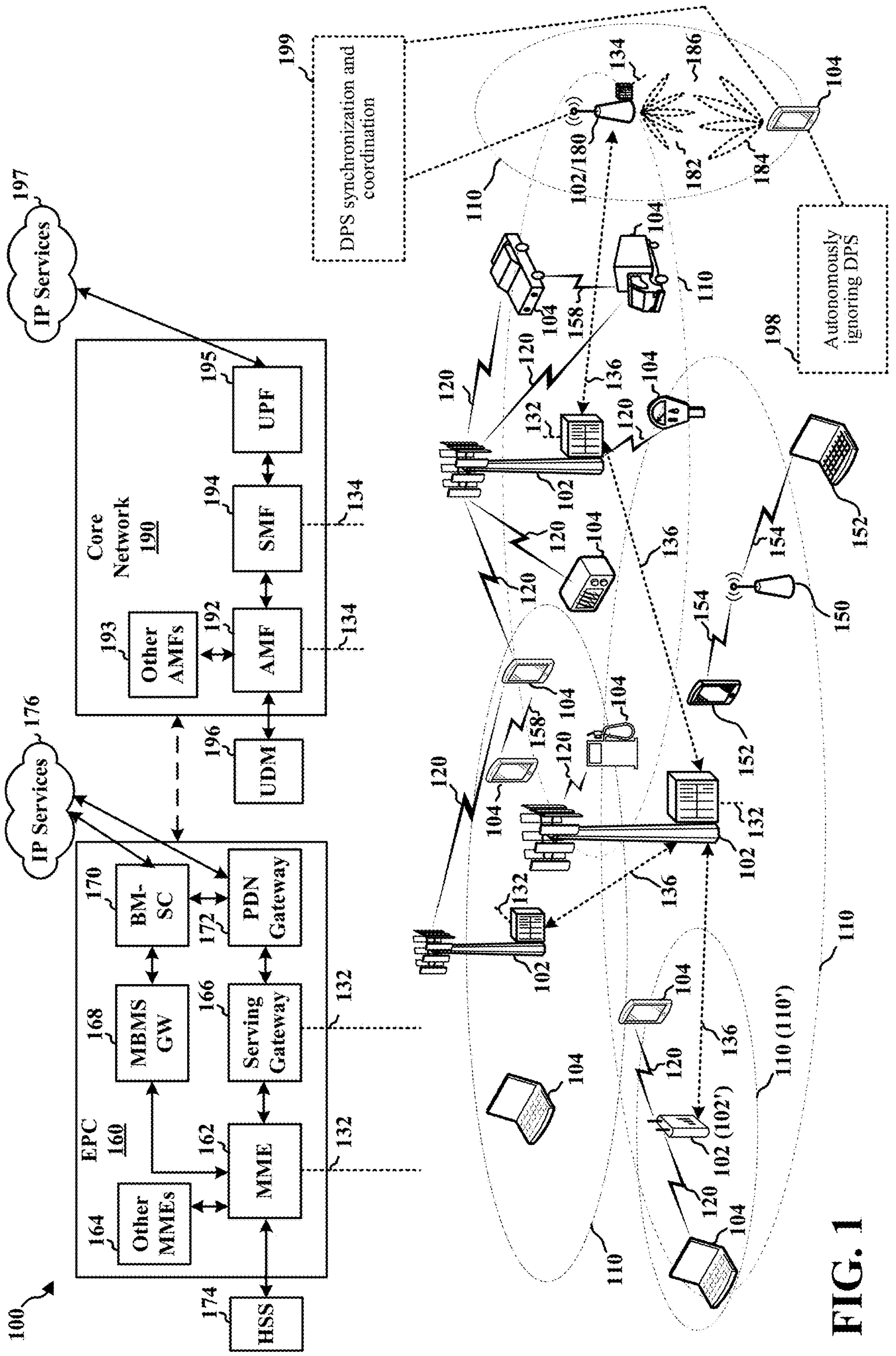
FIG. 1 is a diagram illustrating an example of a wireless communications system and an access network.

Appendix A, incorporated herein in its entirety, is attached hereto and is considered part of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells, such as high power cellular base stations, and/or small cells, such as low power cellular base stations (including femtocells, picocells, and microcells).

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as the Next Generation Radio Access Network (RAN) (NG-RAN), may interface with a core network 190 through second backhaul links 134. In addition to other functions, the base stations 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed and which may communicate with one another. For example, FIG. 2, infra, illustrates an example disaggregated base station 200 architecture that includes at least one of a central unit (CU) 210, a distributed unit (DU) 230, a radio unit (RU) 240, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cells and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network, such as where the UE is in a radio resource control (RRC) Connected state. In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 102' having a small cell coverage area. Some base stations 102 may operate in a traditional sub-6 GHz (or sub-7 GHz) spectrum, in mmW frequencies, and/or near-mmW frequencies in communication with the UE 104. When such a base station operates in mmW or near-mmW frequencies, the base station may be referred to as a mmW base station 180. The mmW base station 180 may utilize beamforming 186 with the UE 104 to compensate for the path loss and short range. The base station 180 and the UE

104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, a UE 104 and a base station 102/180 may synchronize and coordinate discontinuous reception (DRX) preparatory signals (DPSs) associated with a set of DRX cycles (199). The base station 102/180 may transmit, to the UE 104, information configuring a set of DPSs associated with a set of DRX cycles, with each DPS of the set of DPSs indicating an instruction for the UE 104 to transition from a lower power state to a higher power state for a respective DRX cycle of the set of DRX cycles.

In certain other aspects, the UE 104 may be further configured to ignore at least one DPS of the set of DPSs (198). For example, the UE 104 may autonomously determine that the at least one DPS should be ignored. The UE 104 may transmit information indicating the at least one DPS of the set of DPSs was autonomously ignored.

The base station 102/180 may receive the information indicating the at least one DPS of the set of DPSs was autonomously ignored by the UE 104. In response to such information, the base station 102/180 may reconfigure DPSs for the UE 104. The base station 102/180 may transmit the DPS reconfiguration to the UE 104, and the UE 104 may implement the DPS reconfiguration so that the UE 104 and the base station 102/180 may synchronize and coordinate DPSs for upcoming DRX cycles (199).

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2:
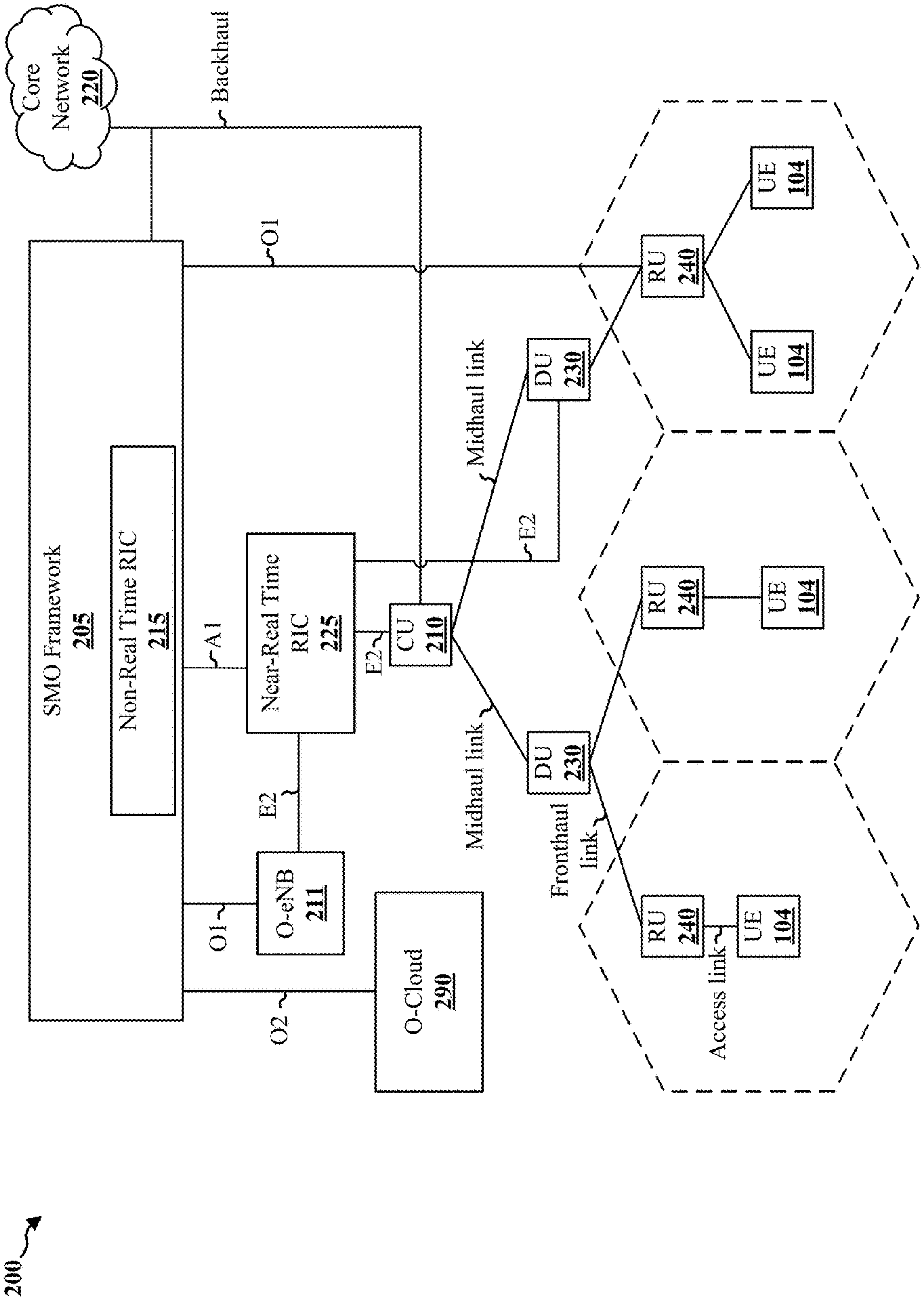
FIG. 2 is a diagram illustrating an example disaggregated base station architecture.

FIG. 2 shows a diagram illustrating an example disaggregated base station 200 architecture. Deployment of communication systems, such as 5G NR systems, may be arranged in multiple manners with various components or constituent parts. In a 5G NR system, or network, a network node, a network entity, a mobility element of a network, a RAN) node, a core network node, a network element, or a network equipment, such as a base station, or one or more units (or one or more components) performing base station functionality, may be implemented in an aggregated or disaggregated architecture. For example, a base station (or network node) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 200 architecture may include one or more CUs 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3A:
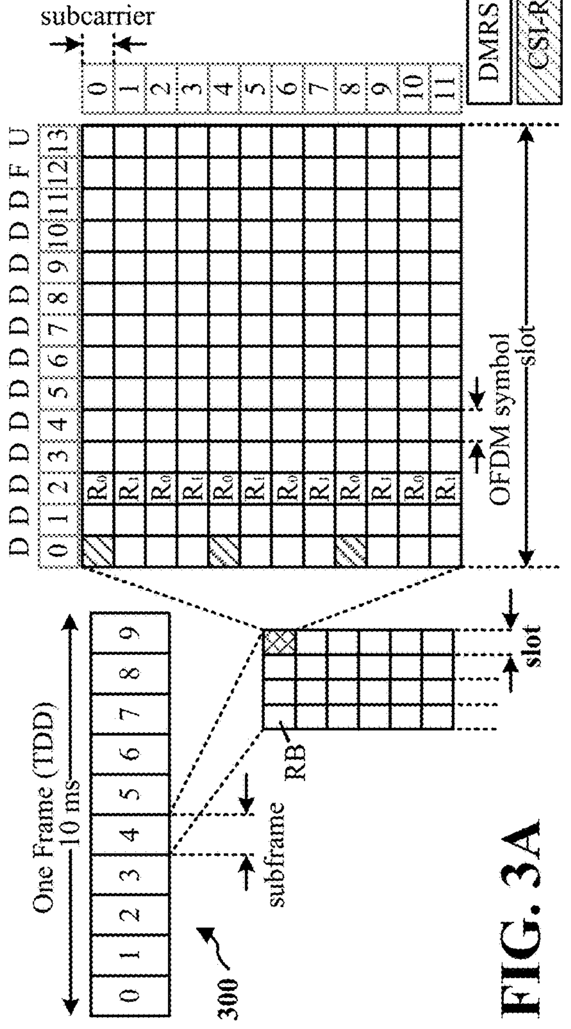
FIG. 3A is a diagram illustrating an example of a first frame, in accordance with various aspects of the present disclosure.
Figure 3B:
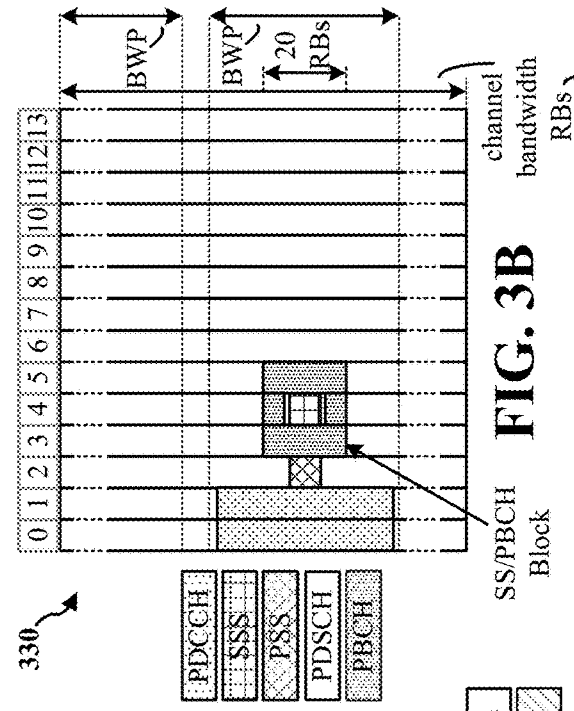
FIG. 3B is a diagram illustrating an example of downlink channels within a subframe, in accordance with various aspects of the present disclosure.
Figure 3C:
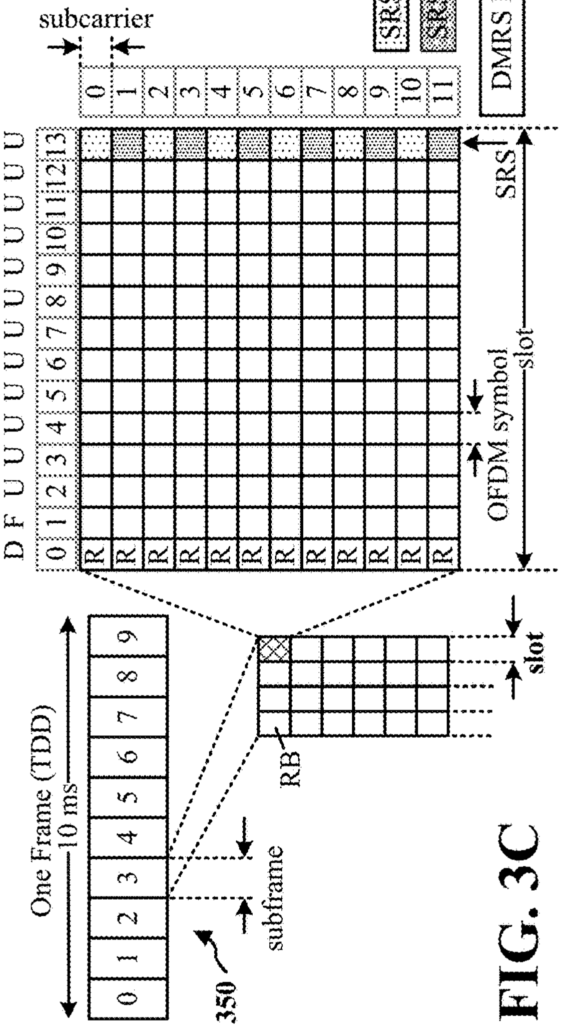
FIG. 3C is a diagram illustrating an example of a second frame, in accordance with various aspects of the present disclosure.
Figure 3D:
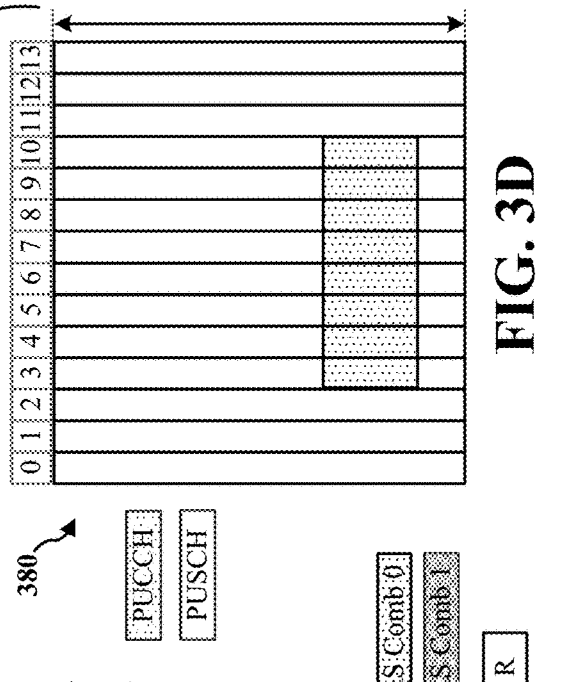
FIG. 3D is a diagram illustrating an example of uplink channels within a subframe, in accordance with various aspects of the present disclosure.

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A and 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 4:
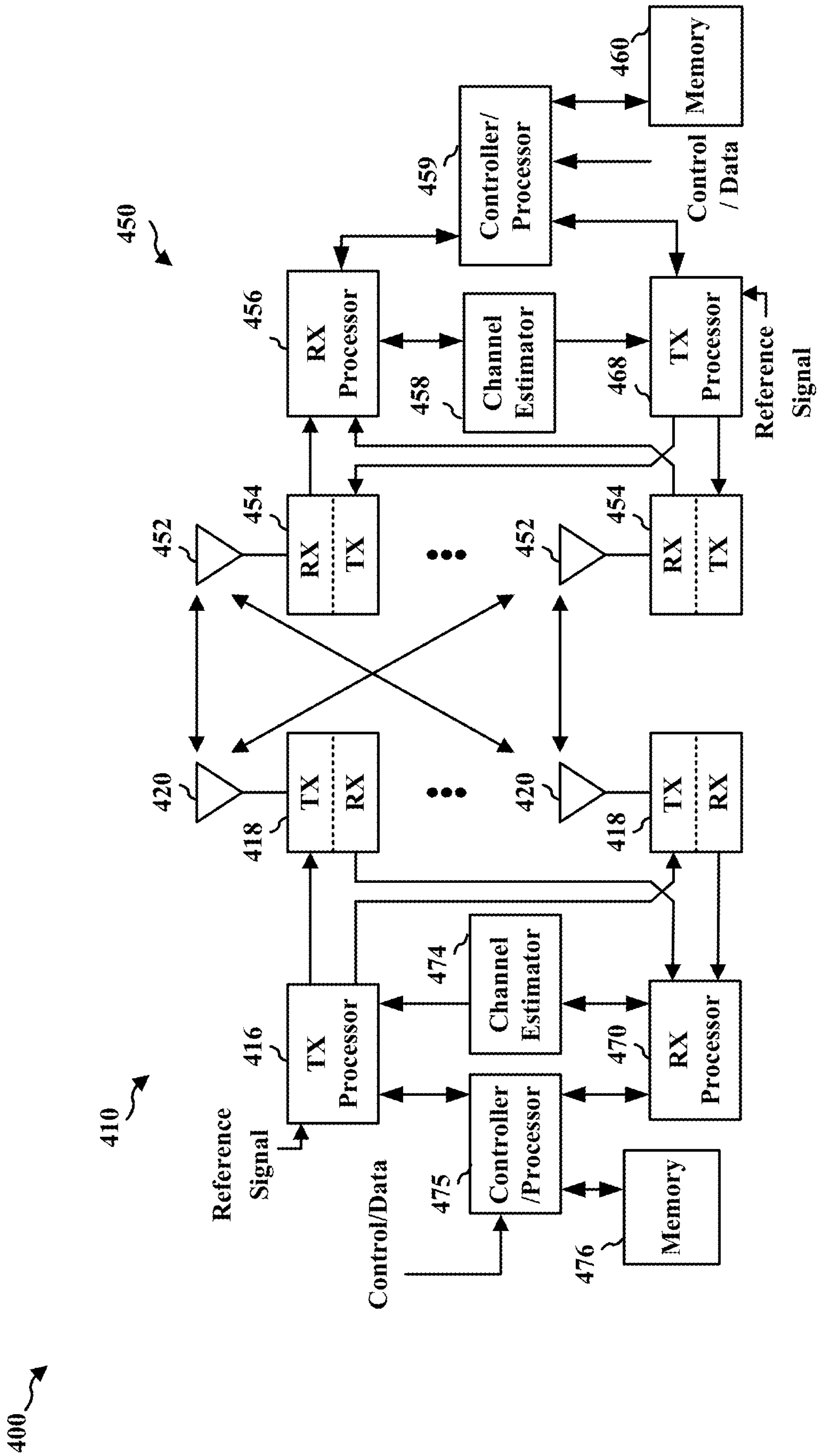
FIG. 4 is a diagram illustrating an example of a base station and user equipment (UE) in an access network.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes a SDAP layer, a PDCP layer, an RLC layer, and a MAC layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement Layer 1 (L1) functionality associated with various signal processing functions. L1, which includes a PHY layer, may include error detection on the transport channels, FEC coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

In some aspects, at least one of the TX processor 468, the RX processor 456, and the controller/processor 459 may be configured to perform aspects in connection with autonomously ignoring a DPS 198 and/or DPS synchronization and coordination 199 of FIG. 1.

In some other aspects, at least one of the TX processor 416, the RX processor 470, and the controller/processor 475 may be configured to perform aspects in connection with DPS synchronization and coordination 199 of FIG. 1.

Figure 5:
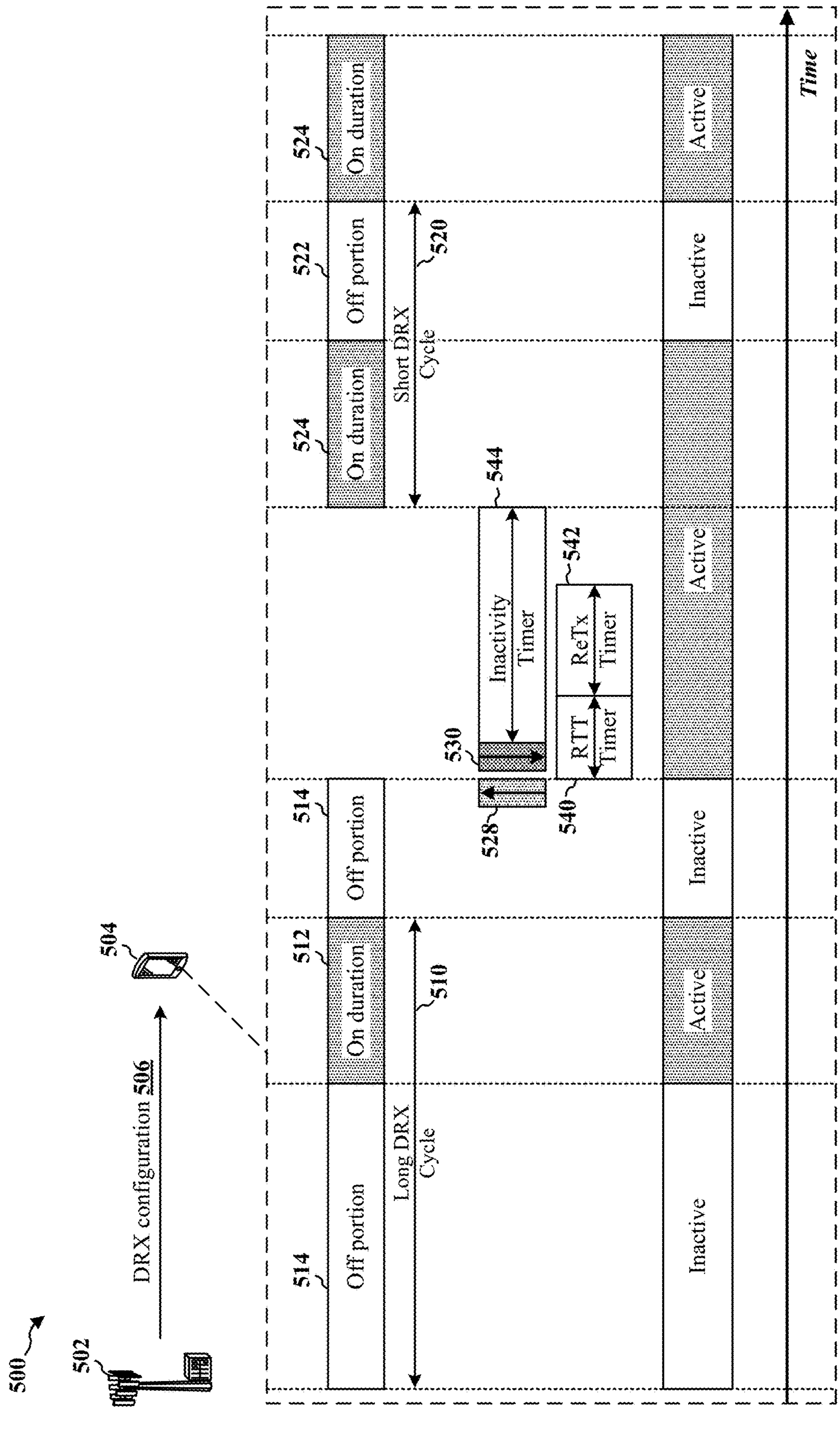
FIG. 5 is a diagram illustrating an example configuration of discontinuous reception (DRX) configured for a UE by a network node.

FIG. 5 is a diagram 500 illustrating an example of DRX operation for a link between a base station 502 and a UE 504. The link may be a Uu link, such as with LTE and/or 5G NR access networks. DRX operation may conserve power at the UE 504, in addition to reducing signaling overhead and network interference (e.g., improved signal-to-noise ratio), by reducing the amount of signaling in which the UE 504 engages.

In some aspects, the base station 502 may configure at least one DRX cycle for the UE 504. Accordingly, the base station 502 may transmit a DRX configuration 506, which may indicate the at least one DRX cycle to the UE 504. For example, the base station 502 may transmit information configuring various parameters or other values that the UE 504 may apply in order to synchronize DRX cycles with those expected of the UE 504 as tracked by the base station 502. Specifically, the DRX configuration 506 may indicate at least one of an on duration 512, 522, an inactivity timer 544, a round trip time (RTT) timer 540, a retransmission (ReTx) timer 542, a long DRX cycle 510, a short DRX cycle 520, and/or other such information. Some of the aforementioned timers may trigger transition by the UE 504 between an active, awake state (e.g., in which the UE 504 monitors for and receives downlink transmission) and an inactive, sleep state (e.g., in which the UE 504 refrains from decoding downlink resources).

The UE 504 may be configured with at least one of a long DRX cycle 510 and a short DRX cycle 520. For example, the long DRX cycle 510 may be 10-50240 ms. The long DRX cycle 510 may include an on duration 512 during which the UE 504 monitors a control channel (e.g., PDCCH) for grants and an off portion 514 during which the UE 504 may not monitor the control channel. For example, the UE 504 may reduce or power off some circuitry and/or other component(s)—specifically, receiver circuitry or other circuitry for monitoring, amplifying, converting, etc. received signaling—during the off portion 514.

When the UE 504 is configured to operate with at least one of the DRX cycles 510, 520, and the UE 504 is connected with the base station 502, the mode of operation of the UE 504 may be connected mode DRX (C-DRX). For example, when the UE 504 is in an RRC Connected state with the base station 502, as when the UE 504 may be assigned uplink grants indicated to the UE 504 on the control channel, the UE 504 may be operating in C-DRX.

Where the base station 502 intends to send data to the UE 504 on a downlink data channel (e.g., PDSCH), the base station 502 may first schedule the data on downlink data channel resources and transmit such scheduling information to the UE 504 in control information 530, which may be a DCI message. The UE 504 may be configured to monitor the downlink control channel (e.g., PDCCH) in order to detect the downlink control information 530 and identify the resources of the downlink data channel scheduled to carry the data intended for the UE 504. For example, the UE 504 may periodically monitor the downlink control channel, e.g., the timing of which may be PDCCH occasions.

In order to elicit an uplink grant and request the base station 502 allocate resources for uplink transmission, the UE 504 may transmit an SR 528. Specifically, data may arrive at a lower layer (e.g., L2, such as the MAC layer) of the UE 504, at which point the data may be buffered while an SR procedure is triggered for the UE 504 in which the UE 504 may transmit an SR 528 and await an uplink grant, which may be included in the control information 530. If the arrival of uplink data from a higher layer coincides with an off portion of a long DRX cycle 510 or an off portion 524 of a short DRX cycle 520, the UE 504 may transition out of an inactive state into an active state in order to find a grant responsive to the SR transmission.

In response to the SR 528, the base station 502 may transmit control information 530 (e.g., DCI), which may indicate a grant including resources allocated to the UE 504 on an uplink (data) channel for transmission of uplink data pending and buffered at the UE 504. Potentially, the base station 502 may transmit some control information to the UE 504 for downlink data, as well, as the base station 502 may assume that the UE 504 will be awake for a duration that is sufficient to receive downlink data while the inactivity timer.

The UE 504 may find the control information 530 (and grant) by decoding information on resources of the control channel; however, such decoding may be blind decoding for which the UE 504 (continuously) attempts to decode any information on the control channel having the potential to be a grant for the UE 504 using an radio network temporary identifier (RNTI) of the UE 504 to evaluate a cyclic redundancy check (CRC) or other similar data integrity/security check. If the check using the UE RNTI passes, then the information on the control channel is intended for the UE 504. If such a check using the UE RNTI fails, the UE ceases decoding the information on the control channel.

Potentially, the UE 504 may fail to receive the control information 530, e.g., because either the UE 504 missed the control information 530 or, if the UE 504 is expecting the control information 530 to include a grant in response to an SR 528, the base station 502 missed the SR 528 or was unable to allocate resources to the UE 504 in response to the SR 528. In aspects in which the control information 530 provides an uplink grant to the UE 504, the UE 504 may fail to transmit pending data on the granted resources if the UE 504 misses the control information 530, as the UE 504 will be unaware of which resources have been allocated to the UE 504. In aspects in which the control information 530 is scheduling a downlink data transmission, the UE 504 may fail to decode the information on the scheduled downlink data channel resources if the UE 504 misses the control information 530, as the UE 504 may be unaware of which downlink data channel resources are carrying data intended for the UE 504.

In some instances, the UE 504 may be configured to retransmit the SR, such as when some uplink data remains pending for a period of time following SR transmission. For example, SR retransmission may be conditioned upon whether data is pending uplink transmission (and whether an SR prohibit timer is running), but SR transmission may be agnostic to whether any grant has been received.

In some aspects, the UE 504 may be configured with an SR prohibit timer to define a duration following transmission of an SR 528 that the UE 504 is to wait before retransmitting an SR where the earlier SR goes unanswered. If the UE 504 does not receive a grant for uplink transmission in response to an SR 528, the UE 504 may retransmit the SR upon expiration of the SR prohibit timer—although the UE 504 does not necessarily need to retransmit the SR, such as when pending uplink data is of a relatively lower priority. SR retransmission assumes that the UE 504 has not already satisfied (e.g., met or exceeded) a maximum number of SR retransmission attempts.

In some aspects, the UE 504 may initiate the RTT timer 540 for a HARQ process of a transmission. If the transmission is an uplink transmission, such as an SR, the RTT timer 540 may start at the end of the uplink transmission. If the transmission is a downlink transmission, the RTT timer 540 may start at the end of an ACK/NACK for the downlink transmission. The RTT timer 540 may measure an amount of time until the UE 504 is to monitor for a grant or scheduling information for a retransmission. The UE 504 may start the ReTX timer 542 to monitor a window during which a grant or schedule for the retransmission may be received.

If the UE 504 receives control information for a retransmission, the UE 504 may start the RTT timer 540 again and monitor for control information again while the ReTx timer 542 is running. Because control information (e.g., scheduling information and/or grant) for a retransmission does not restart the inactivity timer 544, the RTT timer 540 and/or the retransmission timer 542 may run while the UE 504 is in the short DRX cycle. The UE 504 may monitor for the retransmission of control information during the short DRX cycle 520 even if the UE 504 is not in the on duration 522.

Figure 6:
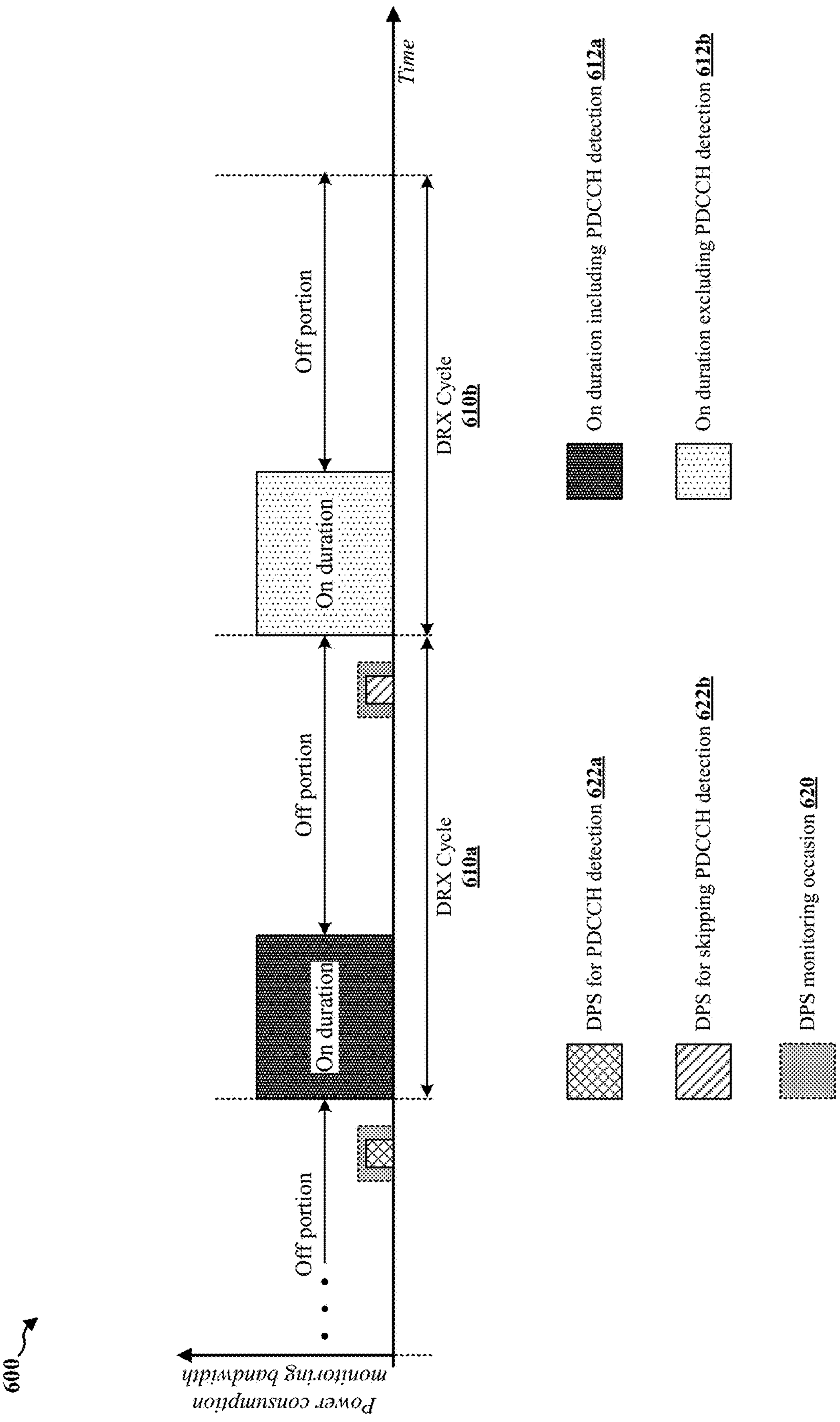
FIG. 6 is a diagram illustrating an example of DRX preparatory signaling (DPS) associated with DRX cycles.

FIG. 6 is a diagram illustrating an example configuration 600 of DPSs 622*a*, 622*b* associated with DRX cycles 610*a*, 610*b*. DRX may be enabled for a UE operating in a connected state of a plurality of potential RRC states or modes (e.g., "RRC Connected" mode), with such operation being termed "Connected DRX" (C-DRX). According to C-DRX, the UE is configured to transition from a lower power state to a higher power state (e.g., "wake up") for an "on duration" of each DRX cycle, during which time the UE monitors the PDCCH to detect control information (e.g., information scheduling data on a PDSCH) carried thereon.

The bursty nature of traffic between a network and UEs implies that on at least some occasions, a relatively small amount of traffic is available to be communicated with a UE. Such a small amount of traffic may reduce the probability that the associated UE will be scheduled, and therefore, "waking up" for the respective "on duration" of each C-DRX cycle may unnecessarily consume UE resources (e.g., power source) when the UE fails to be scheduled.

An approach to reducing the aforementioned unnecessary consumption of UE resources is the use of a DPS or "wakeup signal" (WUS). A DPS may be conveyed via DCI, for example, via DCI format 2_6, as described in connection with FIG. 7, infra. A network node may transmit a DPS to a UE in advance of an upcoming on duration of a DRX cycle in order to instruct the UE to monitor a PDCCH for control information (e.g., information scheduling data on a PDSCH) and/or instruct the UE to remain in a lower power state and refrain from monitoring the PDCCH for control information.

The UE may be configured to monitor for a DPS during DPS monitoring occasions 620 that precede the next consecutive on duration of a DRX cycle. Based on monitoring a set of resources during a DPS monitoring occasion 620, the UE may detect a DPS associated with the next consecutive on duration. In some instances, the UE may detect a DPS 622*a* instructing the UE to monitor a PDCCH during the next consecutive on duration so that the UE may detect scheduling information (e.g., scheduling data on a PDSCH) intended for the UE. For example, the DPS 622*a* may include a bit value set to "1" to indicate that the UE is to wake up to monitor the PDCCH for scheduling information during the on duration 612*a* of the DRX cycle 610*a*.

In some other instances, the UE may detect a DPS 622*b* instructing the UE to refrain from monitoring a PDCCH during the next consecutive on duration, e.g., because data for the UE has not been scheduled. For example, the DPS 622*b* may include a bit value set to "0" to indicate that the UE is to refrain from monitoring the PDCCH during the on duration 612*b* of the DRX cycle 610*b* because no data for the UE has been scheduled.

Thus, the UE may be selectively awakened for those DRX cycles in which the UE is scheduled, and instances in which the UE is unnecessarily awakened only to find that the UE is not scheduled may be avoided. Because the length of the DPS in the time domain is shorter than the on duration timer and/or the bandwidth that the UE monitors to receive a DPS is likely smaller than the bandwidth spanned by the PDCCH, power consumption by the UE may be reduced.

In some configurations, a UE may be configured to wake up to monitor the PDCCH during the on duration of the next consecutive long DRX cycle when the UE fails to receive a DPS (or DCI format 2_6). Potentially, the UE may fail to accurately detect a DPS, for example, due to interference or other poor RF conditions. For network energy conservation, a network node (e.g., gNB) may enter a sleep state on a link with the UE for a C-DRX cycle, and thus the network node may be unaware of whether the UE woke up during the C-DRX cycle. Thus, the network node may be unaware of whether the UE accurately detected (or failed to accurately detect) a DPS.

According to aspects of the present disclosure, a UE may be configured to ignore a DPS, which may contravene a behavior expected of the UE, as configured by the network node. That is, the UE may autonomously determine to ignore at least one DPS, such that the UE remains in a lower power state without monitoring for a DPS during a DPS monitoring occasion 620. For example, the UE may autonomously determine to skip a DPS monitoring occasion 620 based on at least one of data arrival from the network node, an amount of data buffered at the UE, a UE setting associated with bundled transmission, a UE setting associated with UE power saving, or an interval between a time at which the at least one DRX preparatory signal is scheduled and a time at which the UE is scheduled to be in the higher power state for the DRX cycle.

In some illustrative aspects, the UE may skip a DPS monitoring occasion 620 when the amount of data buffered at the UE is less than a threshold amount or when the amount of data available to be bundled is less than a bundling threshold. In some other illustrative aspects, the UE may skip a DPS monitoring occasion 620 when the UE has less than a threshold amount of battery capacity remaining or when the time period between a DPS and a PDCCH is greater than or equal to a threshold.

However, as the UE may autonomously determine to skip a DPS monitoring occasion, synchronization and/or coordination of communication during DRX cycles may be lost. Such a loss of synchronization and/or coordination may result in transmission errors, degradation of the user experience, dropped and/or lost data, unnecessary power consumption, and so forth.

Figure 7:
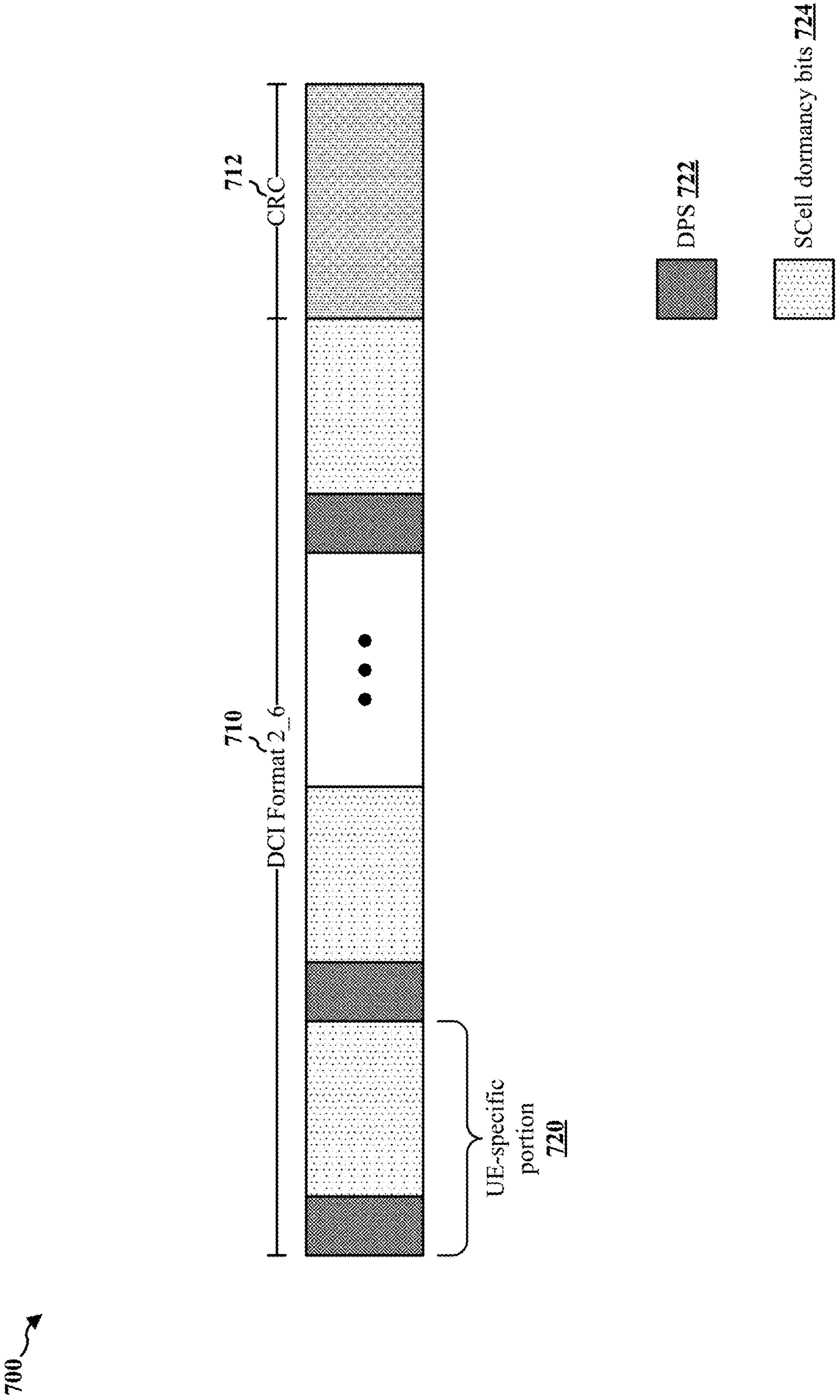
FIG. 7 is a diagram illustrating an example of a control message including downlink control information (DCI) that indicates a DPS.

FIG. 7 is a diagram illustrating an example of a control message 700 including DCI 710 that indicates a DPS 722. The control message may include DCI, such as DCI format 2_6 710 and a CRC 712, which may be calculated and/or scrambled based on a power saving (PS) RNTI.

The DCI 710 may include at least one UE-specific portion 720, which may carry a DPS 722 that is specific to a UE, as well as a set of SCell dormancy bits 724. In some aspects, the DPS 722 may be a single bit value. One bit value, such as "1," may indicate that the UE is to awaken at the next consecutive on duration of a DRX cycle to monitor the PDCCH, as the PDCCH will be carrying control information for the UE. Another bit value, such as "0," may indicate that the UE may remain in the low power state at the next consecutive on duration of a DRX cycle, as the PDCCH will not be carrying control information for the UE.

In some aspects, the DPS 722 may be carried on multiple resources. For example, the DPS 722 may be repeated across a set of resources in order to increase its reliability.

Figure 8:
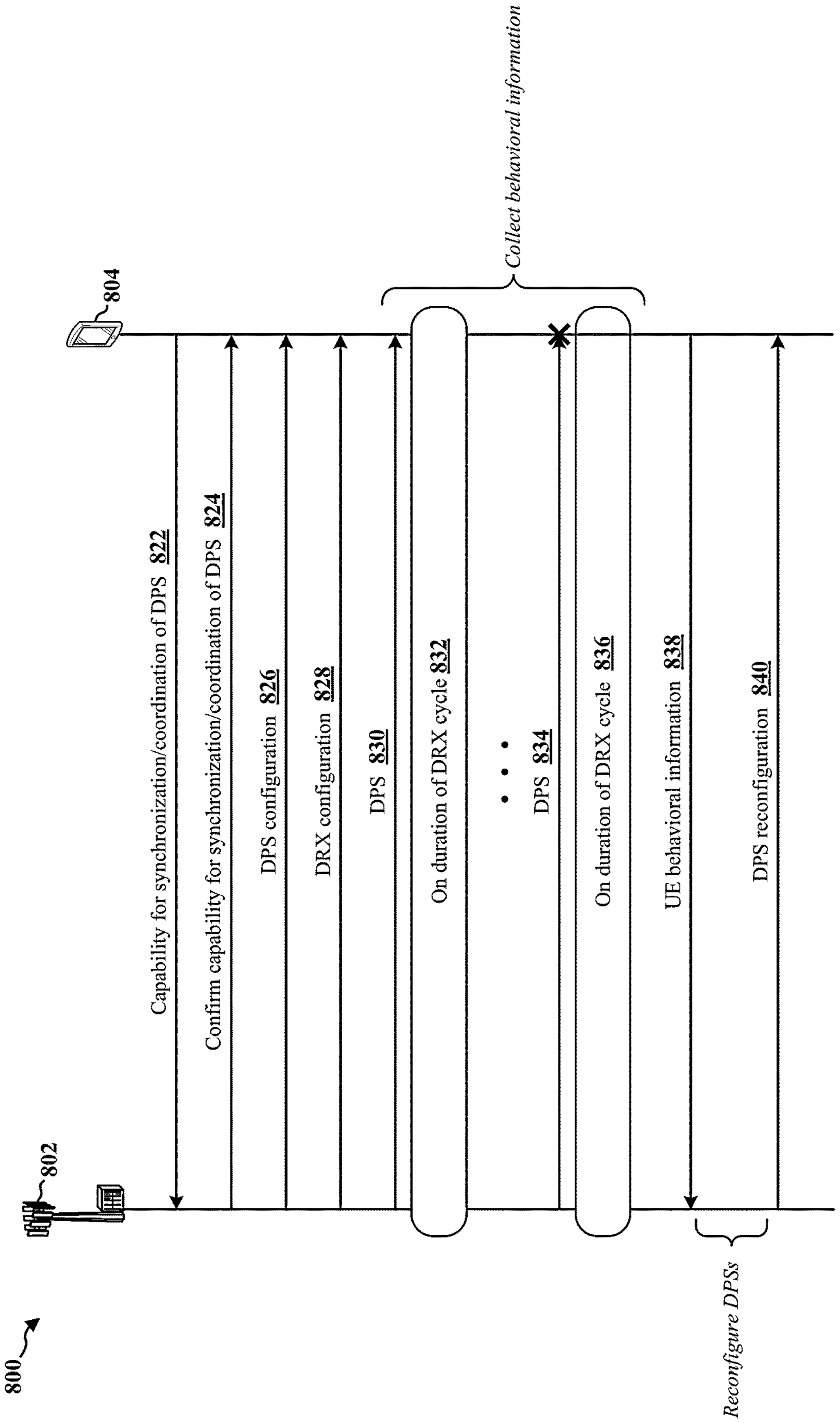
FIG. 8 is a call flow diagram illustrating an example of synchronization and coordination of DPSs associated with DRX cycles.

FIG. 8 is a call flow diagram illustrating an example of synchronization and coordination of DPSs 800 associated with DRX cycles.

At 822, a UE 804 may transmit, to a network node 802, information indicating a capability for coordination with the network node of a set of DPSs associated with a set of DRX cycles. Correspondingly, the network node 802 may receive, from the UE 804, the information indicating a capability for coordination with the UE 804 of a set of DPSs associated with a set of DRX cycles.

At 824, the network node may transmit, to the UE 804, information confirming the capability for coordination with the UE 804 of the set of DPSs associated with a set of DRX cycles. Correspondingly, the UE 804 may receive, from the network node 802, information confirming the capability for the coordination of the set of DPSs.

At 826, the network node 802 may transmit, to the UE 804, information configuring the set of DPSs associated with the set of DRX cycles, with each DPS of the set of DPSs indicating an instruction for the UE 804 to transition from an off duration to an on duration for a respective DRX cycle of the set of DRX cycles. Correspondingly, the UE 804 may receive, from the network node 802, the information configuring the set of DPS associated with the set of DRX cycles.

At 828, the network node 802 may transmit, to the UE 804, information indicating a DRX configuration, which may indicate at least one DRX cycle to the UE 804. For example, the network node 802 may transmit information configuring various parameters or other values that the UE 804 may apply in order to synchronize DRX cycles with those expected of the UE 804 as tracked by the network node 802. Specifically, the DRX configuration may indicate at least one of an on duration, an inactivity timer, an RTT timer, a ReTx timer, a long DRX cycle, a short DRX cycle, and/or other such information. Some of the aforementioned timers may trigger transition by the UE 804 between an active, awake state (e.g., in which the UE 804 monitors for and receives downlink transmission) and an inactive, sleep state (e.g., in which the UE 804 refrains from decoding downlink resources).

At 830, the network node 802 may transmit, to the UE 804, at least one DPS of a set of DPSs configured by the DPS configuration.

At 832, the UE 804 may wake up to monitor the PDCCH for scheduling information at the on duration of the next consecutive DRX cycle based on the DPS.

At 834, the network node 802 may transmit, to the UE 804, at least one other DPS of the set of DPSs configured by the DPS configuration. The UE 804 may autonomously determine to ignore the at least one DPS of the set of DPSs. For example, the UE 804 may autonomously determine to ignore the at least one DPS of the set of DPSs based on at least one of new traffic data, an amount of data buffered at the UE 804, a UE setting associated with bundled transmission, a UE setting associated with UE power saving, or an interval between a time at which the at least one other DPS is scheduled and a time at which the UE is scheduled to be in the higher power state for the next DRX cycle.

At 834, the UE 804 may ignore the at least one other DPS of the set of DPSs. For example, to ignore the at least one DPS of the set of DPSs, the UE 804 may be configured to refrain from monitoring for the at least one DPS on at least one set of resources on which the at least one DPS is scheduled.

At 836, the UE 804 may remain in the lower power state for at least one DRX cycle of the set of DRX cycles that is associated with the at least one other DPS.

During one or more of 830, 832, 834, and/or 836, the UE 804 may collect behavioral information that is based on detecting for the at least one DPS and/or ignoring the at least one other DPS.

At 838, the UE 804 may transmit, to the network node 802, the UE behavioral information that is based on detecting for the at least one DPS and/or ignoring the at least one other DPS. In some aspects, the UE behavioral information is included in at least one MAC CE.

According to various aspects, the UE behavioral information indicates at least one of a request to use DPSs, a request to refrain from using DPSs, a number of the at least one DPS that was ignored, a reason for ignoring the at least one DPS, or a number of the set of DPSs that were undetected. In some aspects, the reason for autonomously ignoring the at least one DPS is based on at least one of new data arrival from the network node, an amount of data buffered at the UE, a UE setting associated with bundled transmission, a UE setting associated with UE power saving, or an interval between a time at which the at least one DPS is scheduled and a time at which the UE is scheduled to be in the higher power state for the DRX cycle.

Based on the UE behavioral information, the network node 802 may be configured to reconfigure a DPS configuration for the UE 804. In some aspects, network node 802 may reconfigure at least one of a resource allocation associated with each of another set of DPSs, a starting offset associated with the resource allocation, a length associated with the resource allocation, a CCE aggregation level associated with each of the another set of DPSs, or a bit position occupied by each of the another set of DPSs.

At 840, the network node 802 may transmit, to the UE 804, a DPS reconfiguration associated with another set of DPSs based on the UE behavioral information. According to various aspects, the DPS reconfiguration associated with the other set of DPSs indicates at least one of an absence of the other set of DPSs, a resource allocation associated with each of the other set of DPSs, a starting offset associated with the resource allocation, a length associated with the resource allocation, a CCE aggregation level associated with each of the other set of DPSs, or a bit position occupied by each of the other set of DPSs.

In some aspects, the network node 802 may be further configured to refrain from transmitting, to the UE 804 based on reconfiguring the DPS configuration, another set of DPSs associated with another set of DRX cycles when the reconfigured DPS configuration indicates that DPSs will not be used for the another set of DRX cycles. Similarly, the UE 804 may be configured to refrain from monitoring for the other set of DPSs when the DPS reconfiguration associated with the other set of DPSs indicates that the other set of DPSs are unscheduled. However, the UE 804 may be further configured to monitor for at least one other DPS of the other set of DPSs when the DPS reconfiguration associated with the other set of DPSs schedules the other set of DPSs.

Figure 9:
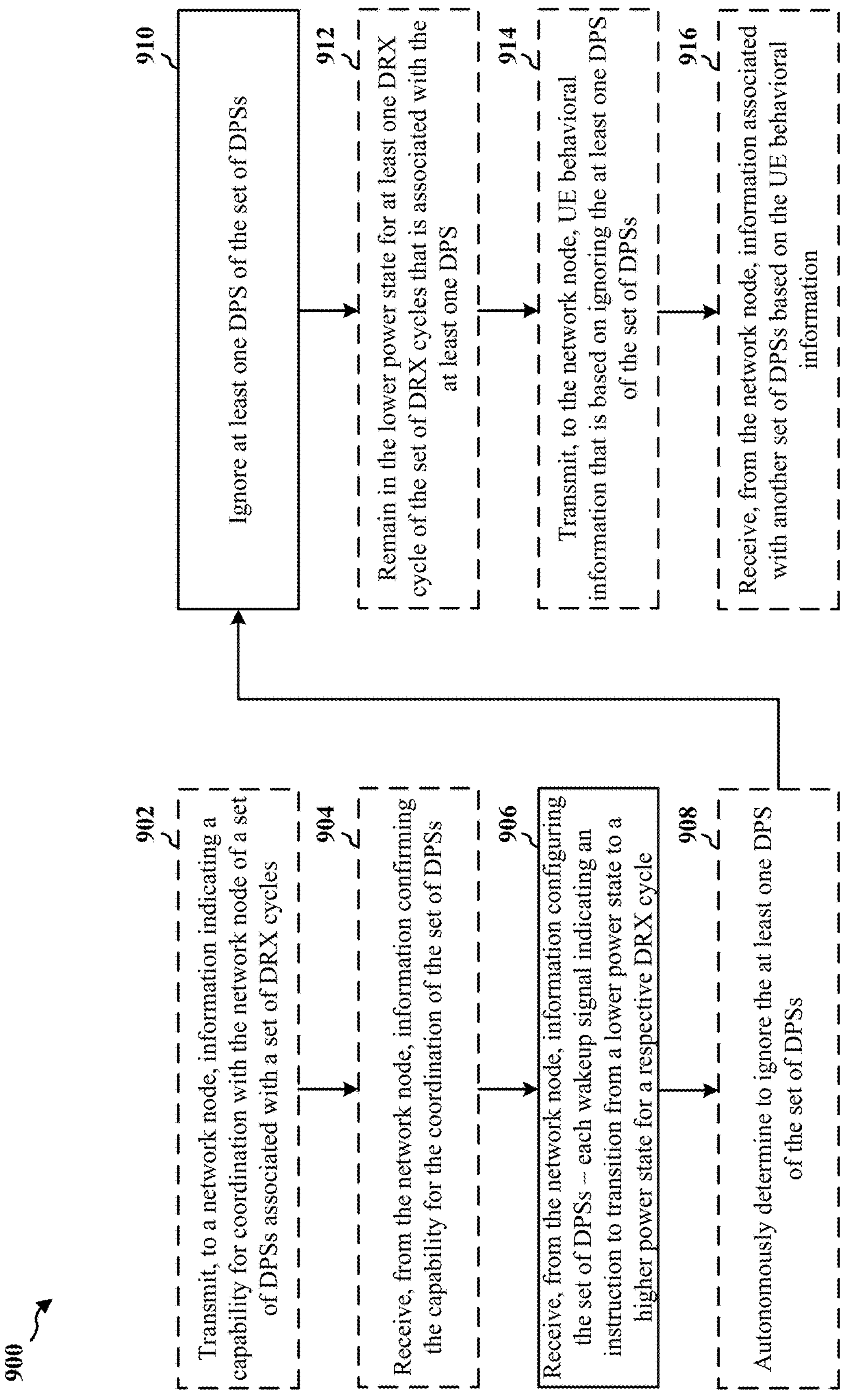
FIG. 9 is a flowchart illustrating an example of a method of wireless communication at a UE.

FIG. 9 is a flowchart of a method 900 of wireless communication. The method 900 may be performed by or at a UE (e.g., the UE 104, 450, 504, 804), another wireless communications apparatus, or one or more components thereof. According to various different aspects, one or more of the illustrated blocks may be omitted, transposed, and/or contemporaneously performed. Optional aspects are illustrated in dashed lines.

Optionally, at 902, the UE may transmit, to a network node, information indicating a capability for coordination with the network node of a set of DPSs associated with a set of DRX cycles.

Optionally, at 904, the UE may receive, from the network node, information confirming the capability for the coordination of the set of DPSs.

At 906, the UE may receive, from a network node, information configuring the set of DPS associated with the set of DRX cycles, with each DPS of the set of DPSs indicating an instruction to transition from a lower power state to a higher power state for a respective DRX cycle of the set of DRX cycles.

Optionally, at 908, the UE may autonomously determine to ignore the at least one DPS of the set of DPSs. For example, the UE may autonomously determine to ignore the at least one DPS of the set of DPSs based on at least one of data arrival from the network node, an amount of data buffered at the UE, a UE setting associated with bundled transmission, a UE setting associated with UE power saving, or an interval between a time at which the at least one DPS is scheduled and a time at which the UE is scheduled to be in the higher power state for the DRX cycle.

At 910, the UE may ignore at least one DPS of the set of DPSs. For example, to ignore the at least one DPS of the set of DPSs, the UE may be configured to refrain from monitoring for the at least one DPS on at least one set of resources on which the at least one DPS is scheduled.

Optionally, at 912, the UE may remain in the lower power state for at least one DRX cycle of the set of DRX cycles that is associated with the at least one DPS.

Optionally, at 914, the UE may transmit, to the network node, UE behavioral information that is based on ignoring the at least one DPS of the set of DPSs. According to various aspects, the UE behavioral information indicates at least one of a request to use DPSs, a request to refrain from using DPSs, a number of the at least one DPS that was ignored, a reason for ignoring the at least one DPS, or a number of the set of DPSs that were undetected. In some aspects, the UE behavioral information is included in at least one MAC CE.

Optionally, at 916, the UE may receive, from the network node, information associated with another set of DPSs based on the UE behavioral information. According to various aspects, the information associated with the other set of DPSs indicates at least one of an absence of the other set of DPSs, a resource allocation associated with each of the other set of DPSs, a starting offset associated with the resource allocation, a length associated with the resource allocation, a CCE aggregation level associated with each of the other set of DPSs, or a bit position occupied by each of the other set of DPSs.

The UE may be further configured to monitor for at least one other DPS of the other set of DPSs when the information associated with the other set of DPSs schedules the other set of DPSs. However, the UE may be configured to refrain from monitoring for the other set of DPSs when the information associated with the other set of DPSs indicates that the other set of DPSs are unscheduled.

The UE may be further configured to predict data traffic between the UE and the network node using artificial intelligence or machine learning such that ignoring the at least one DRX preparatory signal of the set of DRX preparatory signals may be based on the predicted data traffic. In some examples, the UE may apply a system of machine learning algorithms to incoming data to aid in detection of data traffic.

Figure 10:
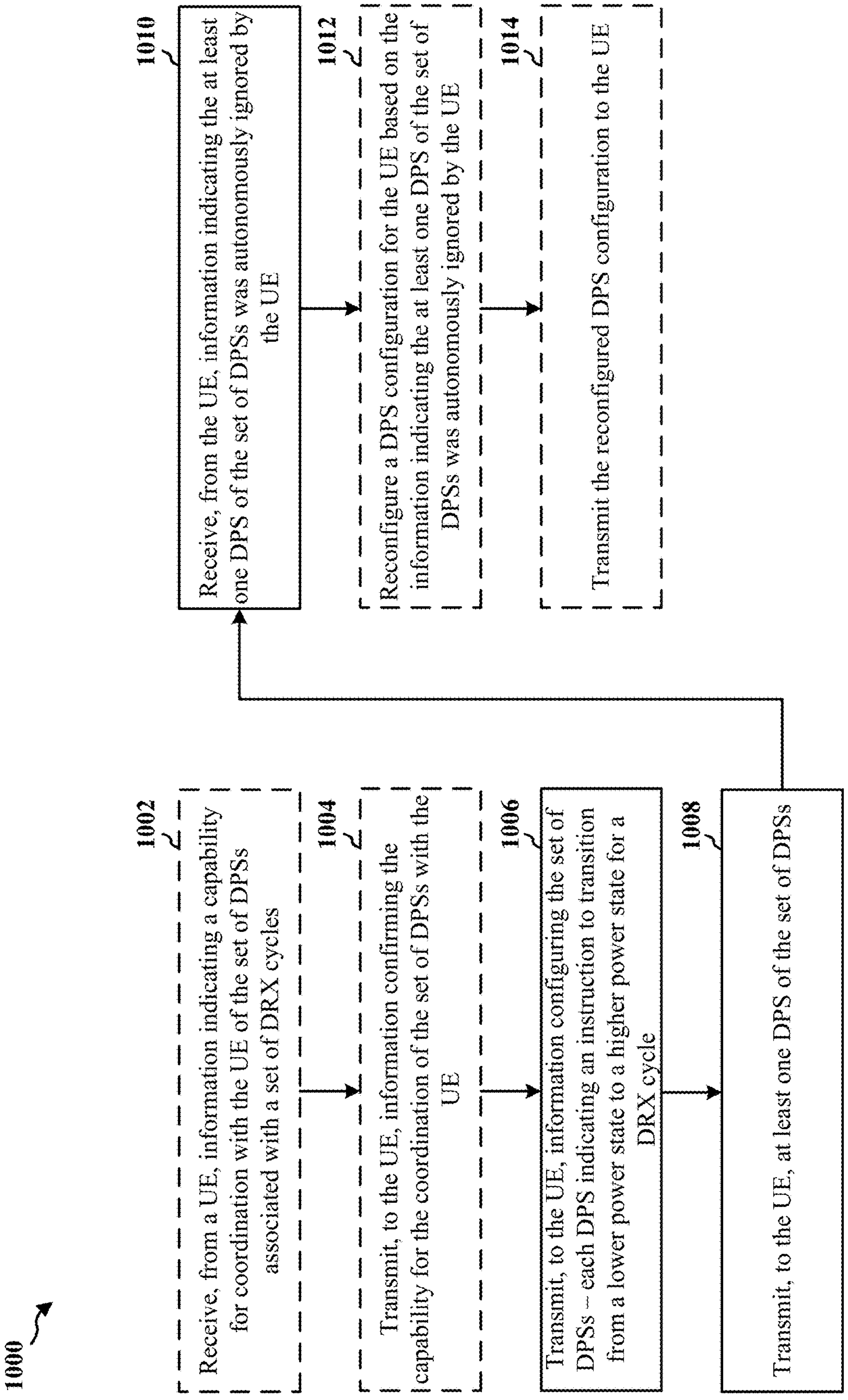
FIG. 10 is a flowchart illustrating an example of a method of wireless communication at a network node.

FIG. 10 is a flowchart of a method 1000 of wireless communication. The method 1000 may be performed by or at a base station (e.g., the base station 102/180, 410, 502), a network node (e.g., the network node 802), another wireless communications apparatus, or one or more components thereof. According to various different aspects, one or more of the illustrated blocks may be omitted, transposed, and/or contemporaneously performed. Optional aspects are illustrated in dashed lines.

Optionally, at 1002, the network node may receive, from a UE, information indicating a capability for coordination with the UE of a set of DPSs associated with a set of DRX cycles.

Optionally, at 1004, the network node may transmit, to the UE, information confirming the capability for the coordination of the set of DPSs with the UE.

At 1006, the network node may transmit, to the UE, information configuring the set of DPSs associated with the set of DRX cycles, with each DPS of the set of DPSs indicating an instruction for the UE to transition from a lower power state to a higher power state for a respective DRX cycle of the set of DRX cycles At 1008, the network node may transmit, to the UE, at least one DPS of the set of DPSs.

At 1010, the network node may receive, from the UE, information indicating the at least one DPS of the set of DPSs was autonomously ignored by the UE. According to various aspects, the information indicating the at least one DPS of the set of DPSs was autonomously ignored by the UE further indicates at least one of a request to use DPSs, a request to refrain from using DPSs, a number of the at least one DPS that was autonomously ignored, a reason for autonomously ignoring the at least one DPS, or a number of the set of DPSs that were undetected by the UE. In some aspects, the reason for autonomously ignoring the at least one DPS is based on at least one of data arrival from the UE, a prediction of data traffic using AI/ML, an amount of data buffered at the UE, a UE setting associated with bundled transmission, a UE setting associated with UE power saving, or an interval between a time at which the at least one DPS is scheduled and a time at which the UE is scheduled to be in the higher power state for the DRX cycle. In some aspects, the information indicating the at least one DPS of the set of DPSs was autonomously ignored by the UE is included in at least one MAC CE.

Optionally, at 1012, the network node may reconfigure a DPS configuration for the UE based on the information indicating the at least one DPS of the set of DPSs was autonomously ignored by the UE Optionally, at 1014, the network node may transmit the reconfigured DPS configuration to the UE. In some aspects, the reconfigured DPS configuration indicates at least one of a resource allocation associated with each of another set of DPSs, a starting offset associated with the resource allocation, a length associated with the resource allocation, a CCE aggregation level associated with each of the another set of DPSs, or a bit position occupied by each of the another set of DPSs. In some aspects, the network node may be further configured to refrain from transmitting, to the UE based on reconfiguring the DPS configuration, another set of DPSs associated with another set of DRX cycles when the reconfigured DPS configuration indicates that DPSs will not be used for the another set of DRX cycles.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

The following examples are illustrative only and may be combined with aspects of other embodiments or teachings described herein, without limitation.

Example 1 may be an apparatus for wireless communication at a UE, including: a memory; and at least one processor coupled to the memory and configured to: receive, from a network node, information configuring a set of DRX preparatory signals associated with a set of DRX cycles, each DRX preparatory signal of the set of DRX preparatory signals indicating an instruction to transition from a lower power state to a higher power state for a respective DRX cycle of the set of DRX cycles; and ignore at least one DRX preparatory signal of the set of DRX preparatory signals.

Example 2 may include the apparatus of Example 1, and the apparatus may be further configured to autonomously determine to ignore the at least one DRX preparatory signal of the set of DRX preparatory signals.

Example 3 may include the apparatus of any of Examples 1 or 2, and to ignore the at least one DRX preparatory signal of the set of DRX preparatory signals includes to refrain from monitoring for the at least one DRX preparatory signal on at least one set of resources on which the at least one DRX preparatory signal is scheduled.

Example 4 may include the apparatus of any of Examples 1 through 3, and to ignore the at least one DRX preparatory signal of the set of DRX preparatory signals is based on at least one of an amount of data buffered at the UE, a UE setting associated with bundled transmission, a UE setting associated with UE power saving, or an interval between a time at which the at least one DRX preparatory signal is scheduled and a time at which the UE is scheduled to be in the higher power state for the DRX cycle.

Example 5 may include the apparatus of Example 1, and the apparatus may be further configured to transmit, to the network node, information indicating a capability for coordination of the set of DRX preparatory signals with the network node.

Example 6 may include the apparatus of Example 5, and the apparatus may be further configured to receive, from the network node, information confirming the capability for the coordination of the set of DRX preparatory signals.

Example 7 may include the apparatus of any of Examples 1 through 6, and the apparatus may be further configured to transmit, to the network node, UE behavioral information that is based on ignoring the at least one DRX preparatory signal of the set of DRX preparatory signals.

Example 8 may include the apparatus of Example 7, and the UE behavioral information indicates at least one of a request to use DRX preparatory signals, a request to refrain from using DRX preparatory signals, a number of the at least one DRX preparatory signal that was ignored, a reason for ignoring the at least one DRX preparatory signal, or a number of the set of DRX preparatory signals that were undetected.

Example 9 may include the apparatus of any of Examples 7 or 8, and the UE behavioral information is included in at least one MAC CE.

Example 10 may include the apparatus of any of Examples 7 through 9, and the apparatus may be further configured to receive, from the network node, information associated with another set of DRX preparatory signals based on the UE behavioral information; monitor for at least one other DRX preparatory signal of the other set of DRX preparatory signals when the information associated with the other set of DRX preparatory signals schedules the other set of DRX preparatory signals; and refrain from monitoring for the other set of DRX preparatory signals when the information associated with the other set of DRX preparatory signals indicates that the other set of DRX preparatory signals are unscheduled.

Example 11 may include the apparatus of Example 10, and the information associated with the other set of DRX preparatory signals indicates at least one of an absence of the other set of DRX preparatory signals, a resource allocation associated with each of the other set of DRX preparatory signals, a starting offset associated with the resource allocation, a length associated with the resource allocation, a CCE aggregation level associated with each of the other set of DRX preparatory signals, or a bit position occupied by each of the other set of DRX preparatory signals.

Example 12 may include the apparatus of Example 1, and the apparatus may be further configured to remain in the lower power state for at least one DRX cycle of the set of DRX cycles that is associated with the at least one DRX preparatory signal.

Example 13 may be an apparatus of wireless communication at a network node, including: a memory; and at least one processor coupled to the memory and configured to: transmit, to a UE, information configuring a set of DRX preparatory signals associated with a set of DRX cycles, each DRX preparatory signal of the set of DRX preparatory signals indicating an instruction for the UE to transition from a lower power state to a higher power state for a respective DRX cycle of the set of DRX cycles; transmit, to the UE, at least one DRX preparatory signal of the set of DRX preparatory signals; and receive, from the UE, information indicating the at least one DRX preparatory signal of the set of DRX preparatory signals was autonomously ignored by the UE.

Example 14 may include the apparatus of Example 13, and the information indicating the at least one DRX preparatory signal of the set of DRX preparatory signals was autonomously ignored by the UE further indicates at least one of a request to use DRX preparatory signals, a request to refrain from using DRX preparatory signals, a number of the at least one DRX preparatory signal that was autonomously ignored, a reason for autonomously ignoring the at least one DRX preparatory signal, or a number of the set of DRX preparatory signals that were undetected by the UE.

Example 15 may include the apparatus of Example 14, and the reason for autonomously ignoring the at least one DRX preparatory signal is based on at least one of an amount of data buffered at the UE, a UE setting associated with bundled transmission, a UE setting associated with UE power saving, or an interval between a time at which the at least one DRX preparatory signal is scheduled and a time at which the UE is scheduled to be in the higher power state for the DRX cycle.

Example 16 may include the apparatus of any of Examples 13 through 15, and the information indicating the at least one DRX preparatory signal of the set of DRX preparatory signals was autonomously ignored by the UE is included in at least one MAC CE.

Example 17 may include the apparatus of any of Examples 13 through 16, and the apparatus may be further configured to receive, from the UE, information indicating a capability for coordination of the set of DRX preparatory signals with the UE.

Example 18 may include the apparatus of Example 17, and the apparatus may be further configured to transmit, to the UE, information confirming the capability for the coordination of the set of DRX preparatory signals with the UE.

Example 19 may include the apparatus of any of Examples 13 through 18, and the apparatus may be further configured to reconfigure a DRX preparatory signal configuration for the UE based on the information indicating the at least one DRX preparatory signal of the set of DRX preparatory signals was autonomously ignored by the UE; and transmit the reconfigured DRX preparatory signal configuration to the UE.

Example 20 may include the apparatus of Example 19, and the apparatus may be further configured to refrain from transmitting, to the UE based on reconfiguring the DRX preparatory signal configuration, another set of DRX preparatory signals associated with another set of DRX cycles, and the reconfigured DRX preparatory signal configuration indicates that DRX preparatory signals will not be used for the another set of DRX cycles.

Example 21 may include the apparatus of any of Examples 19 or 20, and the reconfigured DRX preparatory signal configuration indicates at least one of a resource allocation associated with each of another set of DRX preparatory signals, a starting offset associated with the resource allocation, a length associated with the resource allocation, a CCE aggregation level associated with each of the another set of DRX preparatory signals, or a bit position occupied by each of the another set of DRX preparatory signals.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

receiving, from a network node, information configuring a set of discontinuous reception (DRX) preparatory signals associated with a set of DRX cycles, each DRX preparatory signal of the set of DRX preparatory signals indicating an instruction to transition from a lower power state to a higher power state for a respective DRX cycle of the set of DRX cycles;

ignoring at least one DRX preparatory signal of the set of DRX preparatory signals; and transmitting, to the network node, UE behavioral information that is based on ignoring the at least one DRX preparatory signal of the set of DRX preparatory signals.

2. The method of claim 1, further comprising:

autonomously determining to ignore the at least one DRX preparatory signal of the set of DRX preparatory signals.

3. The method of claim 1, wherein ignoring the at least one DRX preparatory signal of the set of DRX preparatory signals comprises:

refraining from monitoring for the at least one DRX preparatory signal on at least one set of resources on which the at least one DRX preparatory signal is scheduled.

4. The method of claim 1, wherein ignoring the at least one DRX preparatory signal of the set of DRX preparatory signals is based on at least one of data arrival from the network node, an amount of data buffered at the UE, a UE setting associated with bundled transmission, a UE setting associated with UE power saving, or an interval between a time at which the at least one DRX preparatory signal is scheduled and a time at which the UE is scheduled to be in the higher power state for the DRX cycle.

5. The method of claim 1, further comprising:

transmitting, to the network node, information indicating a capability for coordination of the set of DRX preparatory signals with the network node.

6. The method of claim 5, further comprising:

receiving, from the network node, information confirming the capability for the coordination of the set of DRX preparatory signals.

7. The method of claim 1, wherein the UE behavioral information indicates at least one of a request to use DRX preparatory signals, a request to refrain from using DRX preparatory signals, a number of the at least one DRX preparatory signal that was ignored, a reason for ignoring the at least one DRX preparatory signal, or a number of the set of DRX preparatory signals that were undetected.

8. The method of claim 1, wherein the UE behavioral information is included in at least one medium access control (MAC) control element (CE).

9. The method of claim 1, further comprising:

receiving, from the network node, information associated with another set of DRX preparatory signals based on the UE behavioral information;

monitoring for at least one other DRX preparatory signal of the other set of DRX preparatory signals when the information associated with the other set of DRX preparatory signals schedules the other set of DRX preparatory signals; and refraining from monitoring for the other set of DRX preparatory signals when the information associated with the other set of DRX preparatory signals indicates that the other set of DRX preparatory signals are unscheduled.

10. The method of claim 9, wherein the information associated with the other set of DRX preparatory signals indicates at least one of an absence of the other set of DRX preparatory signals, a resource allocation associated with each of the other set of DRX preparatory signals, a starting offset associated with the resource allocation, a length associated with the resource allocation, a control channel element (CCE) aggregation level associated with each of the other set of DRX preparatory signals, or a bit position occupied by each of the other set of DRX preparatory signals.

11. The method of claim 1, further comprising:

remaining in the lower power state for at least one DRX cycle of the set of DRX cycles that is associated with the at least one DRX preparatory signal.

12. The method of claim 1, further comprising:

predicting data traffic between the UE and the network node using artificial intelligence or machine learning, wherein ignoring the at least one DRX preparatory signal of the set of DRX preparatory signals is based on the predicted data traffic.

13. A method of wireless communication at a network node, comprising:

transmitting, to a user equipment (UE), information configuring a set of DRX preparatory signals associated with a set of discontinuous reception (DRX) cycles, each DRX preparatory signal of the set of DRX preparatory signals indicating an instruction for the UE to transition from a lower power state to a higher power state for a respective DRX cycle of the set of DRX cycles;

transmitting, to the UE, at least one DRX preparatory signal of the set of DRX preparatory signals; and receiving, from the UE, information indicating the at least one DRX preparatory signal of the set of DRX preparatory signals was autonomously ignored by the UE.

14. The method of claim 13, wherein the information indicating the at least one DRX preparatory signal of the set of DRX preparatory signals was autonomously ignored by the UE further indicates at least one of a request to use DRX preparatory signals, a request to refrain from using DRX preparatory signals, a number of the at least one DRX preparatory signal that was autonomously ignored, a reason for autonomously ignoring the at least one DRX preparatory signal, or a number of the set of DRX preparatory signals that were undetected by the UE.

15. The method of claim 14, wherein the reason for autonomously ignoring the at least one DRX preparatory signal is based on at least one of data arrival from the UE, an amount of data buffered at the UE, a UE setting associated with bundled transmission, a UE setting associated with UE power saving, or an interval between a time at which the at least one DRX preparatory signal is scheduled and a time at which the UE is scheduled to be in the higher power state for the DRX cycle.

16. The method of claim 13, wherein the information indicating the at least one DRX preparatory signal of the set of DRX preparatory signals was autonomously ignored by the UE is included in at least one medium access control (MAC) control element (CE).

17. The method of claim 13, further comprising:

receiving, from the UE, information indicating a capability for coordination of the set of DRX preparatory signals with the UE.

18. The method of claim 17, further comprising:

transmitting, to the UE, information confirming the capability for the coordination of the set of DRX preparatory signals with the UE.

19. The method of claim 13, further comprising:

reconfiguring a DRX preparatory signal configuration for the UE based on the information indicating the at least one DRX preparatory signal of the set of DRX preparatory signals was autonomously ignored by the UE; and transmitting the reconfigured DRX preparatory signal configuration to the UE.

20. The method of claim 19, further comprising:

refraining from transmitting, to the UE based on reconfiguring the DRX preparatory signal configuration, another set of DRX preparatory signals associated with another set of DRX cycles, wherein the reconfigured DRX preparatory signal configuration indicates that DRX preparatory signals will not be used for the another set of DRX cycles.

21. The method of claim 19, wherein the reconfigured DRX preparatory signal configuration indicates at least one of a resource allocation associated with each of another set of DRX preparatory signals, a starting offset associated with the resource allocation, a length associated with the resource allocation, a control channel element (CCE) aggregation level associated with each of the another set of DRX preparatory signals, or a bit position occupied by each of the another set of DRX preparatory signals.

22. An apparatus of wireless communication at a user equipment (UE), comprising:

a memory; and at least one processor coupled to the memory and configured to:

receive, from a network node, information configuring a set of discontinuous reception (DRX) preparatory signals associated with a set of DRX cycles, each DRX preparatory signal of the set of DRX preparatory signals indicating an instruction to transition from a lower power state to a higher power state for a respective DRX cycle of the set of DRX cycles; and ignore at least one DRX preparatory signal of the set of DRX preparatory signals; and transmit, to the network node, UE behavioral information that is based on ignoring the at least one DRX preparatory signal of the set of DRX preparatory signals.

23. The apparatus of claim 22, wherein the at least one processor is further configured to:

autonomously determine to ignore the at least one DRX preparatory signal of the set of DRX preparatory signals.

24. The apparatus of claim 22, wherein to ignore the at least one DRX preparatory signal of the set of DRX preparatory signals comprises to:

refrain from monitoring for the at least one DRX preparatory signal on at least one set of resources on which the at least one DRX preparatory signal is scheduled.

25. The apparatus of claim 22, wherein to ignore the at least one DRX preparatory signal of the set of DRX preparatory signals is based on at least one of data arrival from the network node, an amount of data buffered at the UE, a UE setting associated with bundled transmission, a UE setting associated with UE power saving, or an interval between a time at which the at least one DRX preparatory signal is scheduled and a time at which the UE is scheduled to be in the higher power state for the DRX cycle.

26. The apparatus of claim 22, wherein the at least one processor is further configured to:

transmit, to the network node, information indicating a capability for coordination of the set of DRX preparatory signals with the network node.

27. An apparatus for wireless communication at a network node, comprising:

a memory; and at least one processor coupled to the memory and configured to:

transmit, to a user equipment (UE), information configuring a set of DRX preparatory signals associated with a set of discontinuous reception (DRX) cycles, each DRX preparatory signal of the set of DRX preparatory signals indicating an instruction for the UE to transition from a lower power state to a higher power state for a respective DRX cycle of the set of DRX cycles;

transmit, to the UE, at least one DRX preparatory signal of the set of DRX preparatory signals; and receive, from the UE, information indicating the at least one DRX preparatory signal of the set of DRX preparatory signals was autonomously ignored by the UE.

28. The apparatus of claim 27, wherein the information indicating the at least one DRX preparatory signal of the set of DRX preparatory signals was autonomously ignored by the UE further indicates at least one of a request to use DRX preparatory signals, a request to refrain from using DRX preparatory signals, a number of the at least one DRX preparatory signal that was autonomously ignored, a reason for autonomously ignoring the at least one DRX preparatory signal, or a number of the set of DRX preparatory signals that were undetected by the UE.

29. The apparatus of claim 28, wherein the reason for autonomously ignoring the at least one DRX preparatory signal is based on at least one of data arrival from the UE, an amount of data buffered at the UE, a UE setting associated with bundled transmission, a UE setting associated with UE power saving, or an interval between a time at which the at least one DRX preparatory signal is scheduled and a time at which the UE is scheduled to be in the higher power state for the DRX cycle.

* * * * *